United States Patent
Ruff et al.

(10) Patent No.: US 7,411,662 B1
(45) Date of Patent: Aug. 12, 2008

(54) SYSTEMS AND METHODS FOR PERFORMING ACTIVE LADAR AND PASSIVE HIGH RESOLUTION IMAGERY

(75) Inventors: William C. Ruff, Catonsville, MD (US); Barry L. Stann, Edgewater, MD (US); Paul H. Shen, North Potomac, MD (US); Brian C. Redman, Silver Spring, MD (US); Keith M. Aliberti, Catonsville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 207 days.

(21) Appl. No.: 11/256,278

(22) Filed: Oct. 20, 2005

(51) Int. Cl.
   *G01C 3/08* (2006.01)
(52) U.S. Cl. .................. 356/5.15; 356/4.01; 382/106
(58) Field of Classification Search ............. 356/5.15, 356/4.01
   See application file for complete search history.

(56) References Cited

U.S. PATENT DOCUMENTS

| 6,806,823 B1* | 10/2004 | Smith et al. ............ 342/62 |
| 2003/0076485 A1* | 4/2003 | Ruff et al. ............ 356/5.09 |
| 2004/0058749 A1* | 3/2004 | Pirritano et al. ........ 473/353 |

* cited by examiner

*Primary Examiner*—Thomas H. Tarcza
*Assistant Examiner*—Timothy A Brainard
(74) *Attorney, Agent, or Firm*—William W. Randolph; A. David Spevack

(57) ABSTRACT

A system and method for performing high-resolution imagery of a target are provided. One embodiment is a method of performing high-resolution imagery of a target comprising: generating a chirped waveform that modulates a light signal transmitted toward a target for performing active LADAR of the target; generating a low-frequency local oscillator waveform for performing active imaging; and simultaneously performing passive imaging and active LADAR.

3 Claims, 4 Drawing Sheets

SYSTEMS AND METHODS FOR PERFORMING ACTIVE LADAR AND PASSIVE HIGH RESOLUTION IMAGERY

GOVERNMENT INTEREST

The invention described herein may be manufactured, used, and licensed by or for the United States Government.

BACKGROUND

1. Technical Field

The invention relates to laser radar and passive imaging systems.

2. Description of the Related Art

Currently, there are a number of techniques for imaging with laser detection and ranging systems (LADAR). LADAR systems have the ability to collect high angular and range resolution imagery of camouflaged targets hidden in deep clutter. LADAR systems use a laser to illuminate an area of interest and, therefore, the resulting imagery is not affected by variations in background illumination or self-emission. However, if detected, the laser emission may be used to locate the position of the LADAR system. Furthermore, because the LADAR is typically designed with a limited amount of available laser power, LADAR systems generally operate over a narrow field-of-view (FOV).

Passive imaging systems, however, operate using the available background illumination from light sources such as the sun or self-emissions of radiation from a target. Because these radiation sources are subject to unpredictable variations for most cases, images derived from passive imaging systems may not be reliable. These variations may also lead to high false-alarm rates. Passive imaging systems, however, are covert because they do not rely on emissions of energy from the detection system to form an image. Furthermore, passive imaging systems may be designed with focal planes that contain a large number of pixels. Therefore, passive imaging systems typically have a wider FOV than LADAR systems.

Examples of laser detection, ranging, or passive imagery are disclosed in U.S. Pat. Nos. 5,608,514 (Stann et. al.), 5,877,851 (Stann et. al.), 6,618,125 (Stann), 6,844,924 (Ruff et. al.), and 6,522,393 (Higashino). Further, for example, U.S. Pat. No. 5,608,514 discloses a system where a detector is followed by a signal mixer; 5,877,851 discloses a system where an electro-optic light modulator is positioned in front of a detector; and 6,844,924 discloses a self-mixing detector, which is also referred to as a metal-semiconductor-metal or an MSM detector. All of the above patents are fully incorporated herein by reference.

SUMMARY

Systems and methods for performing both active LADAR and passive high-resolution imagery of a target are provided. One such embodiment is a LADAR system comprising: a chirp generator for generating a chirped waveform that modulates a light signal transmitted toward a target; a passive waveform generator for generating a low-frequency local oscillator waveform; and a self-mixing detector array that employs the low-frequency local oscillator and the chirped waveforms, the low-frequency local oscillator waveform being used by the self-mixing detector to perform passive imaging and the chirped waveform being used by the self-mixing detector to perform active LADAR for measuring the range to the target.

Another embodiment is a LADAR system comprising: means for generating a chirped waveform that modulates a light signal transmitted toward a target; means for generating a low-frequency local oscillator waveform; and means for detecting signals, the detecting means receiving the low-frequency local oscillator and the chirped waveforms, the low-frequency local oscillator waveform being used by the detecting means to perform passive imaging and the chirped waveform being used by the detecting means to perform active LADAR for measuring the range to the target.

An embodiment of a method for performing high-resolution imagery of a target comprises: generating a chirped waveform that modulates a light signal transmitted toward a target for performing active LADAR of the target; generating a low-frequency local oscillator waveform for performing passive imaging; and simultaneously performing passive imaging and active LADAR.

Another such embodiment of a method comprises: generating a chirped waveform that modules a light signal transmitted toward a target for performing active LADAR of the target; generating a low-frequency local oscillator waveform for performing passive imaging; and determining which of the chirped waveform and the low-frequency local oscillator signal are to be provided to a detector.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Moreover, in the drawings, like reference numerals designate corresponding parts throughout the several views.

DETAILED DESCRIPTION

Figure 1:
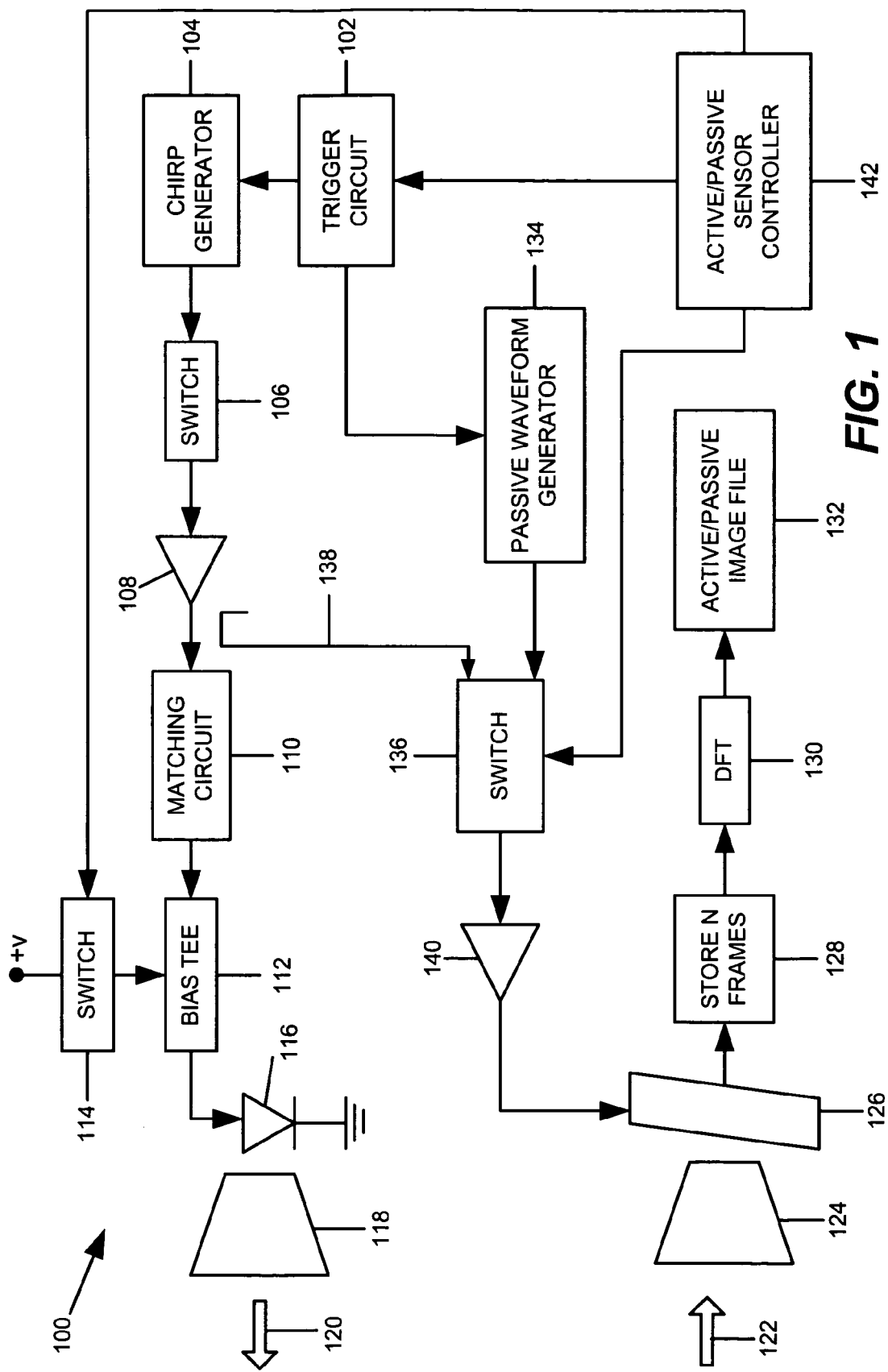
FIG. 1 is a block diagram of an embodiment of a laser detection and ranging (LADAR) and passive imaging system.

This disclosure relates to various embodiments of systems and methods for performing both active LADAR and passive high-resolution imagery of a target. Several embodiments are described below with reference to FIGS. 1-4. As an introductory matter, an exemplary, non-limiting embodiment of a laser detection and ranging (LADAR)/passive imaging system, hereinafter also referred to as the "imaging system" will be briefly described.

In general, an embodiment of a LADAR/passive imaging system provides two high-resolution imaging modes: (1) active LADAR; and (2) passive imaging.

In active LADAR mode, the imaging system operates by modulating a light signal with a known waveform and transmitting the modulated light signal toward a target. A portion of the transmitted laser intensity may be reflected from the target back toward the imaging system and received by detector(s). The received light signal, which contains the original transmitted laser intensity modulation, is delayed in time due to travel along the path from the transmitter to the target and back to the receiver.

In active LADAR mode, the imaging system images the target by detecting ranging data such as distance and amplitude from the received light signal. For instance, the detector(s) may mix the received signal with a local oscillator waveform derived from the original waveform used to modulate the transmission signal, In this manner, an intermediate frequency (IF) waveform may be generated, that can be further processed by the imaging system to determine the ranging data.

In passive imaging mode, the imaging system operates by detecting the passive background illumination/radiation from the target area. The imaging system may use a low-frequency local oscillator (LO) waveform for passive imaging mode. The low-frequency passive LO waveform is used to modulate the responsivity of the detector(s). The imaging system images the target in passive imaging mode by mixing the received passive background signal with the low-frequency passive LO waveform.

The imaging system may simultaneously image in both active LADAR mode and passive imaging mode using the same detector(s). For instance, the imaging system may multiplex the low-frequency passive LO waveform (used for passive imaging mode) with the local oscillator signal derived from the waveform used to modulate the transmission signal. The multiplexed signal may be used to modulate the intensity of the detector(s). In this manner, the LADAR/passive imaging system may form both active (LADAR) and passive images of the target at the same time and using the same detector(s) and optics. In alternative embodiments, the simultaneous imaging in both modes may be disabled and/or removed altogether. In further embodiments, the imaging system may include a switching mechanism that enables the system to be switched back and forth between the two modes. Therefore, rather than simultaneously imaging in both modes, the imaging system may enable a user to select the particular imaging mode.

FIG. 1 illustrates an embodiment of an imaging system 100, which provides two modes of high-resolution imaging: active LADAR and passive imaging. The imaging system 100 includes a switch 136 that is controlled by a signal provided via active/passive sensor controller 142. Switch 136 receives two inputs. One input receives a local oscillator signal 138 that is derived from the signal produced by chirp generator 104. The local oscillator signal is used for active LADAR imaging. The other input receives a low frequency waveform from passive waveform generator 134. This input is used for passive imaging. The low frequency or passive waveform may comprise a number of different types of waveforms. For instance, the passive waveform may comprise a low-frequency waveform in the form of a sine wave or a pseudo-random wave. In response to the control signal from active/passive sensor controller 142, switch 136 provides one of the two input signals to detector(s) 126. In the embodiment of FIG. 1, the switched signal may be amplified via amplifier 140 before being provided to detector(s) 126.

Referring to the active LADAR mode, imaging system 100 includes a trigger circuit 102 that activates chirp generator 104 for producing a chirp signal with a frequency that increases linearly as a function of time over a period of time, T. The chirp signal is provided to a wideband RF power amplifier 108 and to a matching circuit 110 that matches the driving impedance of the amplifier to the impedance of a laser diode 116.

Laser diode 116 converts the chirp signal into a light waveform with power proportional to the driving current of the chirp signal. A divergent laser light beam produced by the laser diode is collected by transmission optics 118, collimated, and directed toward a target (as indicated by arrow 120). The portion of transmitted light that is reflected by the target and propagated back to imaging system 100 (arrow 122) is collected by reception optics 124 and focused onto the active detection region of detector(s) 126. A variety of types of detectors may be employed, such as those identified above in U.S. Pat. Nos. 5,608,514, 5,877,851, 6,618,125, 6,844,924 and 6,522,393.

Detector(s) 126 convert the collected incident light into a low frequency waveform with an amplitude that is proportional to the power of the transmitted light, and a frequency proportional to the range to the target.

A subtraction technique that is implementable with analog-to-digital converters, memory chips, and microwave switches is designed to eliminate self-clutter problems. Referring to the embodiment of FIG. 1, a switch 106 may be opened to interrupt the transmission of light to the target, therefore leaving only the self-clutter signal present at the output of the detectors 126. The self clutter signal from 126 is captured in the sample and store circuit 128 and placed in a data file. For subsequent chirp periods, the switch 106 is closed and the total IF signal is then sampled and stored in a second file in the sample-and-store memory circuit 128. The clutter signal from the first file in the sample-and-store memory circuit is subtracted from the total IF signal stored in a second file in the second sample-and-store memory circuit.

As illustrated in FIG. 1, the subtracted output is provided to discrete Fourier transform circuitry 130 to map the received time domain IF signal into the frequency domain or, equivalently, the range domain, to indicate the distance to the target. The updating rate of the stored self-clutter signal is based on the rate of change of the self-clutter signal and the degree of cancellation required to meet LADAR sensitivity requirements. In other words, the operation of the switch 106 can be performed as often as required to assure that the self-clutter signal in the first sample-and-store memory circuit is constantly updated to reflect current conditions.

As mentioned above, trigger circuit 102 initiates generation of a linear frequency modulated sinusoidal chirp signal in chirp generator 104. The chirp signal will persist for some period, T. A chirp signal is simply a sinusoidal waveform whose frequency linearly increases over T.

As illustrated in the embodiment of FIG. 1, the chirp signal is fed into an amplifier 108 (e.g., a wideband radio frequency (RF) power amplifier) that modulates the current driving laser diode 116. Wideband matching circuit 110 matches the driving impedance of amplifier 108 to laser diode 116 over the modulation bandwidth. Matching the driving impedance of the amplifier causes the light beam intensity to be highly amplitude modulated (AM) and causes the peak intensity to be constant as a function of chirp frequency. Output from wideband matching circuit 110 and a DC current (+V) are summed in bias tee 112 to provide the current drive for laser diode 116 with a bandwidth at least equal to the chirp waveform.

The divergent laser beam from laser diode 116 is collected by transmission optics 118, which collimates the light in a beam that is sufficiently wide to encompass or floodlight the target scene of interest. As mentioned above, a portion of the laser light is reflected from the target back toward the LADAR (arrow 122) and collected by reception optics 124. An electro-optic light modulator in front of the detector 126 may be driven by the original laser modulation waveform by receiving a portion of the output of amplifier 108 (local oscillator signal 138) and providing the signal to the switch 136 as described above. The local oscillator signal 138 may be used to image in active LADAR mode by mixing the local oscillator signal 138 with the light reflected from the target.

The electro-optic modulator modulates (mixes) the received light from the target with the original chirp signal and the resulting mixed light signal is then focused onto a focal plane detector array. Each photo-detector element in the focal plane detector array converts incident light power into an electric charge that is proportional to the integral of the light power taken over the sampling time of the array. Thus, the modulator multiplies the optical signal from the target with the chirp waveform and passes the modulated optical signal to an optical detection array where it is converted into an electrical signal.

Amplifiers within the focal plane detector array convert the electric charge to produce a voltage proportional to the light energy. This voltage represents a sample of the intermediate frequency (IF) waveform normally recovered in frequency modulation (FM) radar systems. To collect a full IF waveform, the focal plane detector array collects data periodically along the chirp period and sends it to a memory (store N frames 128). The data set in the memory may contain, for each pixel, an intermediate frequency (IF) waveform which includes all of the magnitude, range, and phase information derived from the light reflected from the target.

After the chirp period (T), the dimensional data set in memory is passed to a signal processor which computes the range or forms range cells by performing the Discrete Fourier Transform (DFT) on the time signal resident in each pixel. The transformed data set is a three-dimensional image file of the original illuminated scene (e.g., active image file 132).

The active LADAR mode may be implemented using a number of alternative components, waveforms, such as those identified above in U.S. Pat. Nos. 5,608,514, 5,877,851, 6,618,125, 6,844,924, and 6,522,393. In one exemplary embodiment of LADAR/passive imaging system 100, the imaging system uses a self-mixing detector assembly comprising a metal-semiconductor-metal (MSM) detector With the active LADAR mode of imaging system 100 having been described, the passive imaging mode will now be described. As mentioned above, imaging system 100 comprises a passive waveform generator 134, which generates a low-frequency local oscillator signal to be used for passive imaging. The low frequency or passive waveform is provided to switch 136 and, if the control signal is appropriately enabled, the waveform is provided to detector(s) 126. The low-frequency, passive LO waveform is used to modulate the responsivity of detector(s) 126, which also multiplies the near constant, passive background signal. This shifts the passive background signals to a frequency in the pass-band of the subsequent detector amplifiers. The passive background signal can be amplified and processed in much the same manner as the LADAR waveforms described above. In this manner, the passive imaging and the active LADAR may be combined to allow perfectly matched and pixel-registered active and passive imagery. As illustrated in FIG. 1, the image formed while imaging system 100 is in LADAR mode may be saved as an active image file and the image formed in passive imaging mode may be saved as a passive image file 132.

Figure 2:
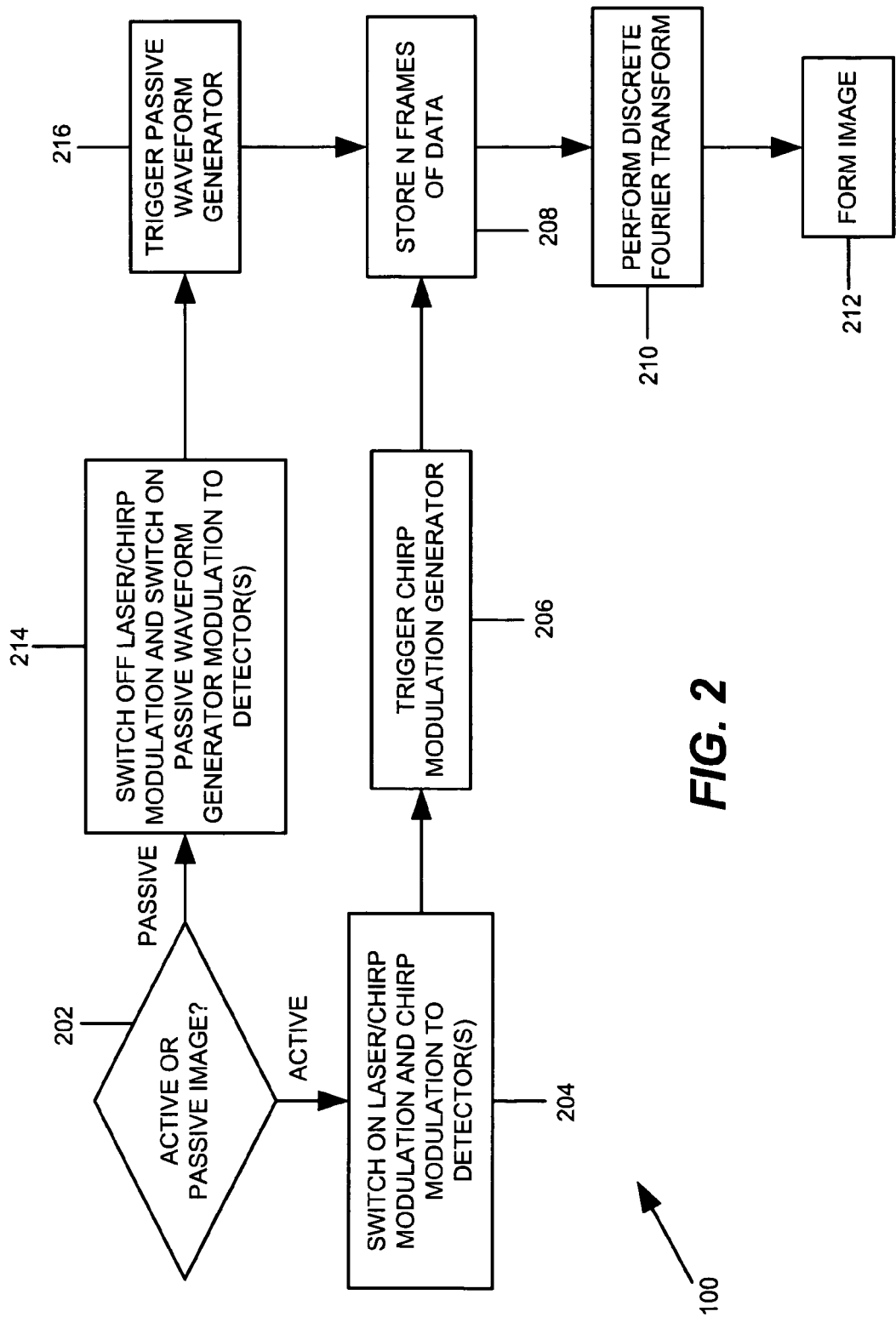
FIG. 2 is a flow chart illustrating operation of the LADAR/passive imaging system of FIG. 1.

FIG. 2 is a flow chart illustrating an embodiment of the architecture, operation, and/or functionality of LADAR/passive imaging system 100. At block 202, imaging system 100 determines the mode in which the system is to operate, i.e., active LADAR or passive imaging. As mentioned above, this operation may involve switch 136 and the control signal from active/passive sensor controller 142. In the passive mode (blocks 214 and 216), imaging system 100 switches off laser/chirp modulation and switches on the passive waveform generator modulation to detector(s) 126. Imaging system 100 also triggers passive waveform generator 134 to begin modulating the responsivity of detector(s) 126.

For the active imaging mode (blocks 204 and 206 in FIG. 2), imaging system 100 switches on laser/chirp modulation and chirp modulation to detector (s) 126. Imaging system 100 also triggers chirp generator 104 to begin modulating the responsivity of detector(s) with local oscillator signal derived from the chirp signal. The processing of the output of detector(s) 126, as described above, is illustrated in block 208 (store N frames of data), block 210 (perform discrete Fourier transform), and block 212 (form active/passive image).

Figure 3:
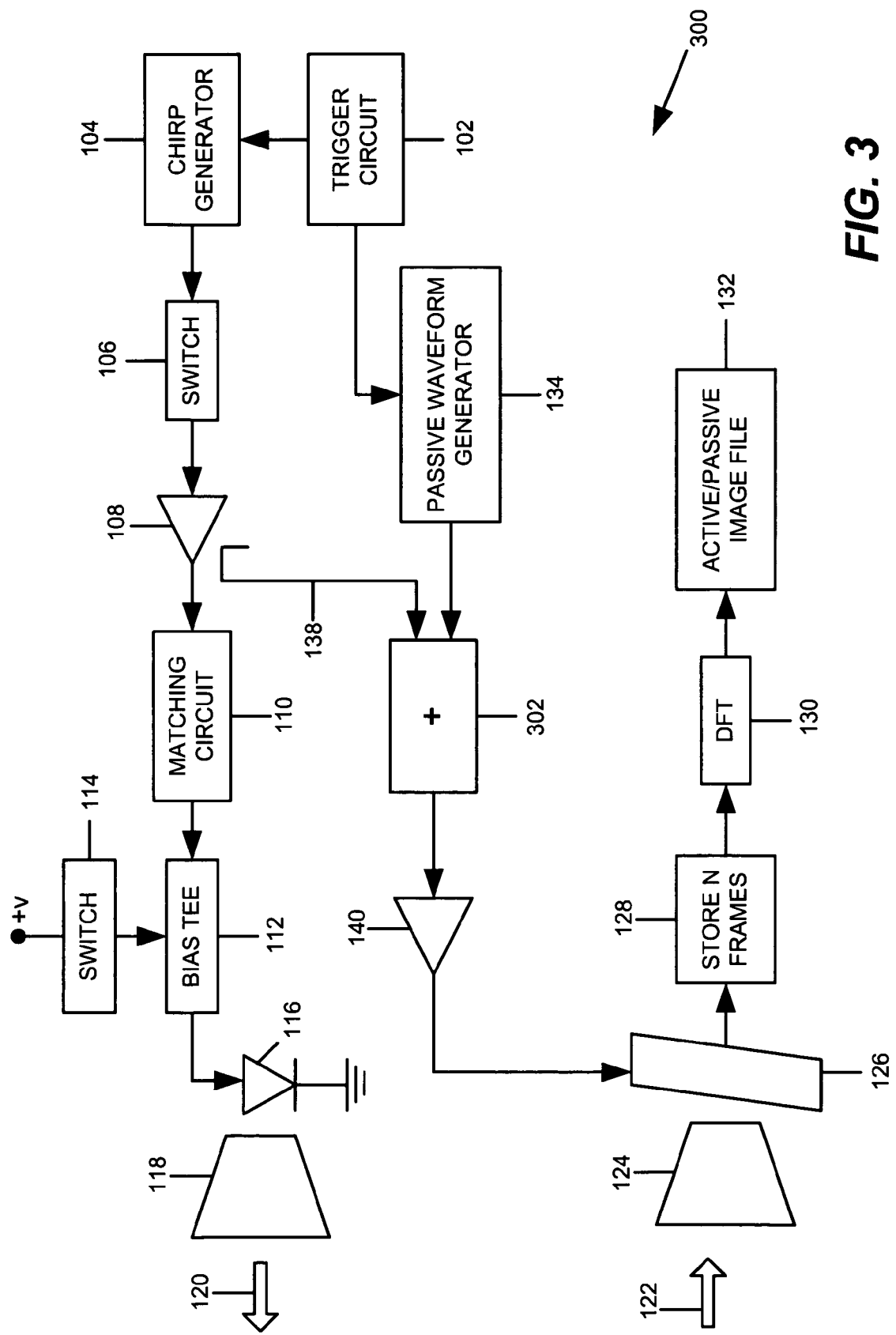
FIG. 3 is a block diagram of another embodiment of a LADAR/passive imaging system.

FIG. 3 illustrates an alternative embodiment of an imaging system 300 in which passive imaging and LADAR are performed simultaneously. Imaging system 300 is configured in much the same manner as described above with respect to FIGS. 1 and 2. The LADAR/passive imaging system 300, however, replaces switch 136 with a multiplexer 302. Multiplexer 302 receives, as inputs, the passive waveform (to be user for passive imaging) and the local oscillator derived from the original waveform for modulating the transmitted light signal. Multiplexer 302 multiplexes the two signals and provides the multiplexed signal to detector(s) 126. The multiplexed signal is used to modulate the responsivity of detector(s) 126. Detector(s) 126 operate in the manner described above. Both the active and passive imagery are acquired simultaneously and must be de-multiplexed to obtain the active and passive image data, the only significant difference is that the output signal of the detector(s) has to be demultiplexed to obtain the active and passive image data, which may be used to form the active image and the passive image.

Figure 4:
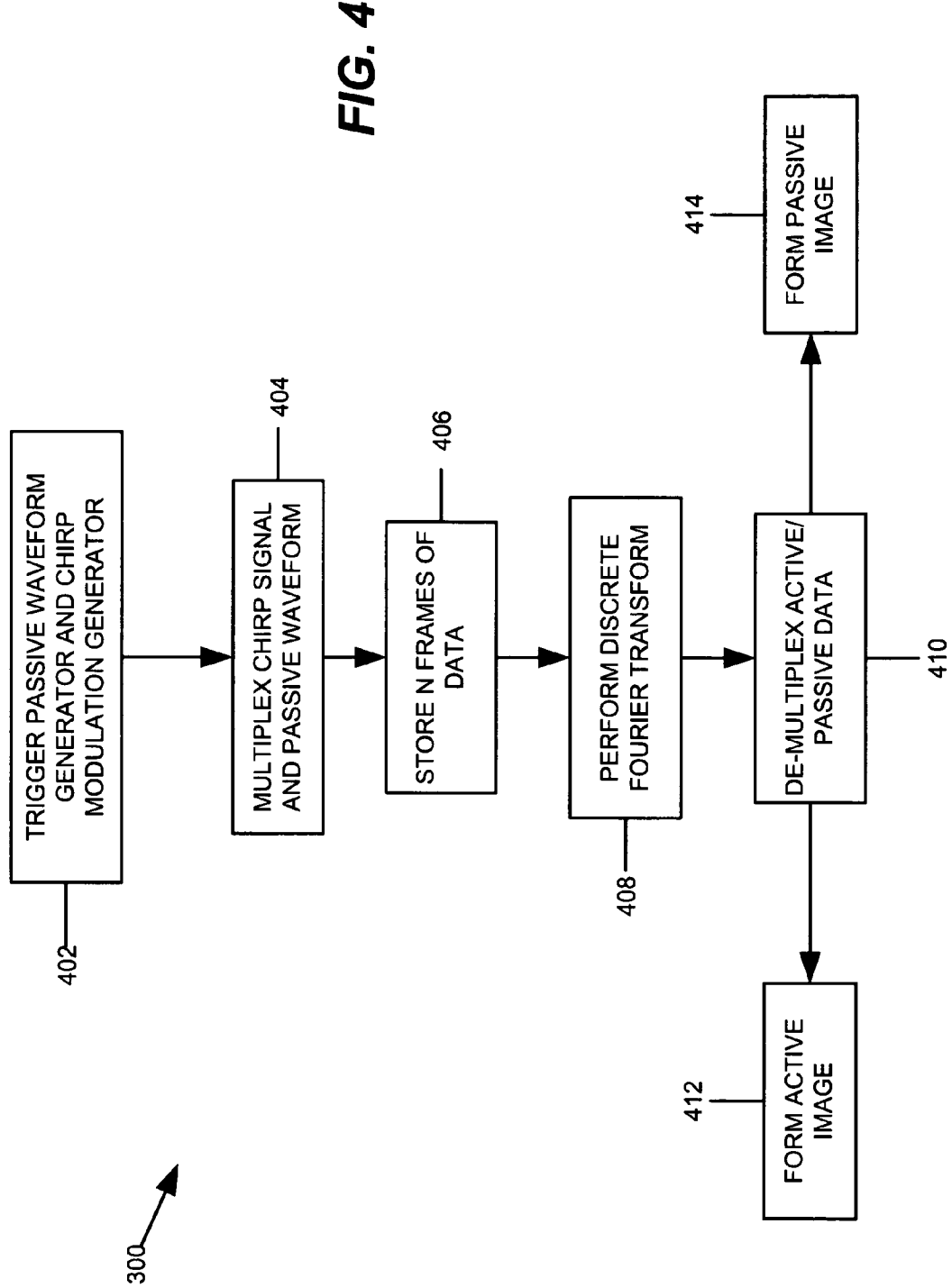
FIG. 4 is a flow diagram illustrating operation of the LADAR/passive imaging system of FIG. 3.

FIG. 4 is a flow chart illustrating operation of imaging system 300. At block 402, imaging system 300 triggers passive waveform generator 134 and chirp generator 104. At block 404, the passive waveform and the local oscillator signal derived from the chirped waveform are multiplexed (e.g., time-multiplexed, frequency code, etc.). The standard processing of the signals is performed at block 406 (store N frames of data) and block 408 (perform discrete Fourier transform). At block 410, LADAR/passive imaging system 300 demultiplexes the passive and active data from the output signal of detector(s) 126, so that the corresponding active image (block 412) and passive image (block 414) may be formed.

It should be emphasized that many variations and modifications may be made to the above-described embodiments. All such modifications and variations are intended to be included herein within the scope of this disclosure and protected by the following claims.

What is claimed is:

1. An imaging system comprising:
   a chirp generator for generating a chirped waveform that modulates a light signal transmitted toward a target;
   a passive waveform generator for generating a low-frequency local oscillator waveform; and
   a self-mixing detector array that receives the low-frequency local oscillator and the chirped waveforms, where the low-frequency local oscillator waveform is configured to be used by the self-mixing detector to perform passive imaging and the chirped waveform is configured to be used by the self-mixing detector to perform active LADAR to determine the range to the target; further comprising a multiplexer configured to multiplex the low-frequency local controller signal with the chirped waveform and further configured to provide the multiplexed signal to the self-mixing detector.

2. An imaging system comprising:

means for generating a chirped waveform that modulates a light signal transmitted toward a target;

means for generating a low-frequency local oscillator waveform; and means for detecting and self-mixing a light signal, the detecting means receiving the low-frequency local oscillator and the chirped waveforms, the low-frequency local oscillator waveform being used by the detecting means to perform passive imaging and the chirped waveform being used by the detecting means to perform active LADAR for measuring the range to the target; further comprising means for multiplexing the low-frequency local controller signal with the chirped waveform and providing the multiplexed signal to the detecting means.

3. A method for performing active LADAR imaging and passive high-resolution imaging of a target, the method comprising:

generating a chirped waveform that modulates a light signal transmitted toward a target for performing active LADAR of the target;

generating a low-frequency local oscillator waveform for performing passive imaging; and simultaneously performing passive imaging and active LADAR and wherein the simultaneously performing passive imaging and active LADAR imaging comprises multiplexing the chirped waveform and the low-frequency local oscillator waveform; further comprising modulating the responsivity of a self-mixing detector with the multiplexed signal.

* * * * *